(12) United States Patent
Freitag et al.

(10) Patent No.: US 7,708,139 B2
(45) Date of Patent: May 4, 2010

(54) RECORDING MEDIUM STORAGE PACKAGE HAVING IMPROVED ROSETTE

(75) Inventors: Kenny Freitag, Cheshire, MA (US); Daniel Ed Cornwell, Pittsfield, MA (US); James Philippe, Sanford, MA (US)

(73) Assignee: MeadWestvaco Corporation, Richmond, VA (US)

( * ) Notice: Subject to any disclaimer, the term of this patent is extended or adjusted under 35 U.S.C. 154(b) by 241 days.

(21) Appl. No.: 10/598,505

(22) PCT Filed: Mar. 4, 2005
(Under 37 CFR 1.47)

(86) PCT No.: PCT/US2005/006871
§ 371 (c)(1),
(2), (4) Date: Aug. 6, 2008

(87) PCT Pub. No.: WO2005/093756
PCT Pub. Date: Oct. 6, 2005

(65) Prior Publication Data
US 2009/0152141 A1     Jun. 18, 2009

Related U.S. Application Data

(60) Provisional application No. 60/550,654, filed on Mar. 5, 2004.

(51) Int. Cl.
*B65D 85/57*     (2006.01)
(52) U.S. Cl. ..................... 206/310; 206/308.1
(58) Field of Classification Search ............. 206/308.1, 206/310, 309, 312, 303, 1.5, 493; 211/41.12
See application file for complete search history.

(56) References Cited

U.S. PATENT DOCUMENTS

| | | | | |
|---|---|---|---|---|
| 4,327,831 A | * | 5/1982 | Inaba et al. | 206/310 |
| 4,874,085 A | * | 10/1989 | Grobecker et al. | 206/308.1 |
| 5,402,882 A | * | 4/1995 | Bandy et al. | 206/310 |

(Continued)

FOREIGN PATENT DOCUMENTS

GB    2 243 145 A    10/1991

(Continued)

OTHER PUBLICATIONS

International Search Report for PCT/US2005/006871 mailed Aug. 12, 2005.

*Primary Examiner*—David T Fidei
(74) *Attorney, Agent, or Firm*—Thomas A. Boshinski (57) ABSTRACT

An enclosure for securing a disc having a central aperture includes a base and a pivotable cover. A two part disc securing rosette has a first part on the base including at least two upstanding, circularly spaced apart segments with arcuate outer peripheral surfaces dimensioned for engaging the central aperture of a disc and a second part including at least two elongate, upstanding ribs extending radially from a position on the cover which is centered on the segments on the base, the number of ribs on the cover corresponding to the number of segments on the base, the ribs being positioned and dimensioned such that, when the enclosure is closed, the ribs on the cover enter the first part radially inwardly of the segments with the ribs contacting the radially inside surface of the corresponding arcuate segments for bracing the arcuate segments against breakage.

8 Claims, 5 Drawing Sheets

U.S. PATENT DOCUMENTS

| | | | | |
|---|---|---|---|---|
| 5,515,968 A | * | 5/1996 | Taniyama | 206/310 |
| 5,845,771 A | | 12/1998 | Fu et al. | |
| 5,906,276 A | * | 5/1999 | Bolognia et al. | 206/308.1 |
| 6,047,821 A | | 4/2000 | Hashimoto et al. | |
| 6,196,384 B1 | * | 3/2001 | Belden, Jr. | 206/308.1 |
| 6,227,363 B1 | | 5/2001 | Lu | |
| 6,382,414 B1 | * | 5/2002 | Chang | 206/308.1 |
| 6,540,074 B1 | * | 4/2003 | Sankey et al. | 206/387.13 |
| 6,729,469 B1 | * | 5/2004 | Yau et al. | 206/308.1 |
| 6,901,600 B2 | * | 5/2005 | Liu | 720/719 |
| 2002/0112976 A1 | * | 8/2002 | Huber | 206/310 |
| 2002/0134695 A1 | | 9/2002 | Marsilio et al. | |
| 2003/0019771 A1 | * | 1/2003 | Iandoli et al. | 206/310 |
| 2003/0024832 A1 | | 2/2003 | Kwok-Din | |
| 2003/0150755 A1 | * | 8/2003 | Chen | 206/310 |
| 2003/0168361 A1 | * | 9/2003 | Lau | 206/310 |
| 2004/0026274 A1 | * | 2/2004 | Bruet-Ferreol | 206/308.1 |
| 2004/0206641 A1 | * | 10/2004 | Lau | 206/308.1 |

FOREIGN PATENT DOCUMENTS

| | | |
|---|---|---|
| WO | WO 93/12993 A | 7/1993 |

* cited by examiner

RECORDING MEDIUM STORAGE PACKAGE HAVING IMPROVED ROSETTE

CROSS-REFERENCE TO RELATED APPLICATIONS

This is a non-provisional application based upon U.S. provisional application Ser. No. 60/550,654, filed Mar. 5, 2004.

FIELD OF THE INVENTION

The present invention relates generally to enclosures for receiving and storing digitally encoded discs and, more particularly, to an improved disc retaining means for holding such discs within such enclosures.

BACKGROUND OF THE INVENTION

Various types of planar discs are in use at the present time to record and store information which is to be retrieved by various means, such as by optical or magnetic means. Typical of such discs are compact discs and DVD discs (hereinafter referred to generically as CDs) on which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. In either case, optical imperfections in or on the surfaces of such discs interfere with both the recording and retrieval of information stored on the discs. Care must, therefore, be taken in the storage, moving and handling of such discs to avoid causing any such imperfections. As used herein, the term compact disc or CD is intended to encompass all such discs, whatever their size, for all known or proposed uses.

Compact discs containing laser recorded information are typically packaged in enclosures designed to hold one or more CDs for protecting the discs during storage and shipment. Enclosures commonly used at the present time comprise a three piece assembly consisting of a base or bottom element, an insert in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the insert, and position and support the disc via the center projection directly on the base/bottom element. The enclosure is, typically, at least partially transparent and graphics relating to the disc and containing trademark and sales promotional information are usually inserted in such a manner as to be visible through the enclosure. In another form of CD packaging, a tray having a rosette projecting from the base thereof for receiving and supporting the CD is attached to a paperboard component, which folds over the tray to enclose the CD.

It has become conventional for at least the CD receiving and supporting element of the CD enclosures to be formed by injection molding. As a consequence the rosettes are formed of the same plastic material as the base or tray with which they are integrally molded. The base and/or tray elements and, therefore, the rosettes have historically been made from pigmented thermoplastic molding resins having sufficient impact resistance to withstand the forces attendant to mounting and unmounting CDs as well as the forces experienced during shipping and handling. More recently, it has become desirable to form the enclosure out of a more transparent plastic material, such as crystalline polystyrene. Although such a material makes the enclosure more attractive and the graphics and promotional materials more legible, it is more brittle and easily shattered than previously used thermoplastics and has, in large part, diminished the protection afforded the disk by the enclosure and its mounting rosette.

Therefore, it has become desirable to improve certain aspects of the heretofore conventional CD enclosures, for example, by improving their impact resistance to avoid damage during shipping or if dropped. For these same reasons, it has become desirable to better retain the disc on the rosette in the package. In addition, in order to reduce shipping costs and to conserve retail space, it is desirable to design and manufacture thinner overall packages, particularly for multiple disc packages.

However, efforts to date at solving these problems suffer from one or more shortcomings which make the resulting package unsatisfactory or the rosette not particularly desirable for use in a CD enclosure. This is because prior art CD packaging, particularly the rosettes, are either of complex construction and, therefore, uneconomical to manufacture or unacceptably fragile and unreliable in use, which presents substantial risk of damaging the information bearing surface of the disc. Accordingly, there remains a need for a simple, inexpensive to manufacture and easy to use rosette for a CD package which is configured to facilitate safe mounting and unmounting of the disc thereon and which does not present a damage risk for the disc's information bearing surface. There is also a need for thinner and lighter overall packages, particularly for multiple disc packages, in order to reduce material costs, to conserve retail space and to reduce shipping costs.

SUMMARY OF THE INVENTION

It is, therefore, a primary object of the present invention to provide a CD enclosure which is easy to use and relatively inexpensive to manufacture.

It is also an object of the present invention to provide a CD enclosure which is thinner and lighter than conventional enclosures in order to reduce material costs, conserve retail space and reduce shipping costs.

It is another object of the present invention to provide a CD enclosure having an improved disc retaining means for holding discs within the enclosure.

It is still another object of the present invention to provide a thin CD enclosure having an improved disc holding means which has sufficient impact resistance to withstand the forces attendant to mounting and unmounting CDs.

It is a further object of the present invention to provide a CD enclosure having an improved disc holding means which, notwithstanding its thinness, has sufficient impact resistance to avoid damage during shipping and when dropped.

The foregoing and other objects are achieved in accordance with the present invention by providing an enclosure for securing and storing at least one disc-shaped element having a central aperture therein, said enclosure comprising:

a substantially planar base having a first area for receiving a centrally apertured disc;

a substantially planar cover;

a spine panel pivotably connecting said base and cover for allowing the base and cover to pivot between enclosure open and closed positions;

a two part rosette for securing said at least one disc-shaped element in said enclosure, said rosette including;

a first part centered in said area on said base, said first part comprising at least two upstanding, circularly spaced apart segments having arcuate outer peripheral surfaces dimensioned for engaging the central aperture of a disc-shaped element at circularly spaced apart positions around its central aperture;

a second part attached to said cover, said second part comprising at least two elongate, upstanding ribs extending radially from a position on said cover which is centered on said area of said base, the number of ribs on said cover corresponding to the number of segments on said base, the ribs being positioned and dimensioned such that, when the enclosure is closed, the ribs on the cover enter said first part radially inwardly of said segments on said first part with the radial outermost edge of each of the ribs contacting the inside radial surface of the corresponding arcuate segments for biasing the arcuate segments radially outwardly to better retain a disc-shaped element when it is mounted on said arcuate segments in said first area.

In another aspect of the invention, there is provided an enclosure for securing and storing at least two disc-shaped elements having a central aperture therein, which includes all of the features of the enclosure for securing and storing at least one disk-shaped element, wherein said cover includes a second area for receiving a centrally apertured disc, said ribs on said cover being positioned within said second area, said second area being in registry with said first area when said enclosure is closed, said second part includes at least two upstanding, circularly spaced apart segments having arcuate outer peripheral surfaces dimensioned for engaging the central aperture of a disc-shaped element at circularly spaced apart positions around its central aperture, said segments being positioned in said second area radially outwardly of said ribs on said cover, said first part including at least two elongate, upstanding ribs extending radially from a position on said base which is centered on said second area of said cover, the number of ribs on said base corresponding to the number of segments on said cover, the ribs on said base being positioned and dimensioned such that when the enclosure is closed, the arcuate segments on the base and cover do not contact each other and the ribs on the base enter said second part radially inwardly of said segments on said second part, without contacting the ribs on said cover, with the radial outermost edge of each of said ribs on said base contacting the radially inside surface of the corresponding arcuate segments on said cover for biasing the arcuate segments radially outwardly to better retain a disc-shaped element when it is mounted on said arcuate segments in said second area.

DESCRIPTION OF THE PREFERRED EMBODIMENT

Figure 1:
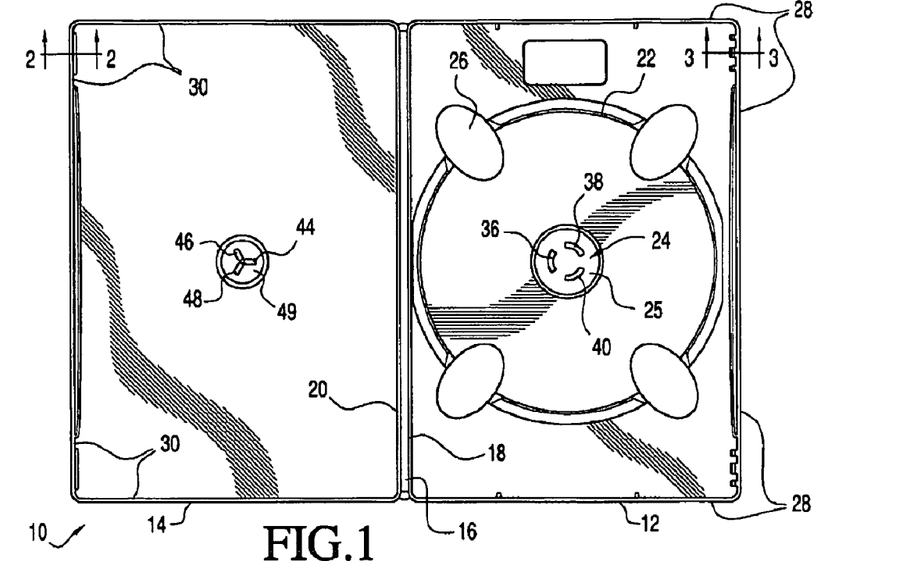
FIG. 1 is a plan view of one embodiment of a single disc package of the present invention.
Figure 2:
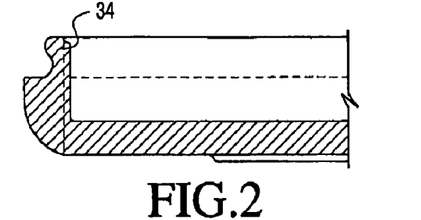
FIG. 2 is a sectional view taken along line 2-2 in FIG. 1.
Figure 3:
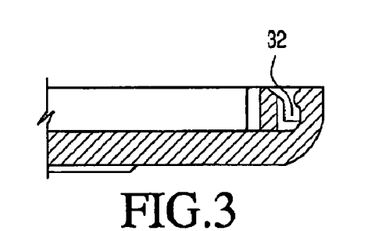
FIG. 3 is a sectional view taken along line 3-3 in FIG. 1.
Figure 4:
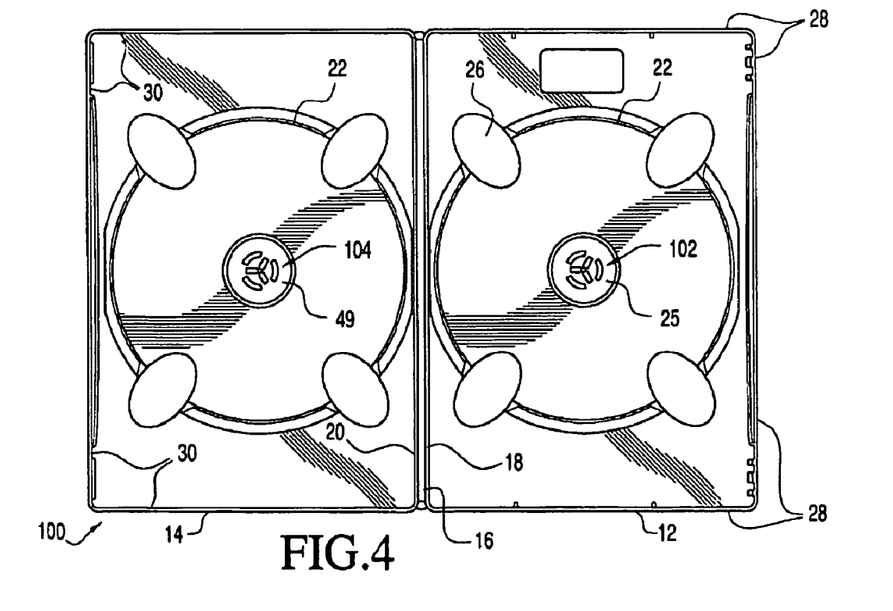
FIG. 4 is plan view of one embodiment of a double disc package of the present invention.
Figure 5:
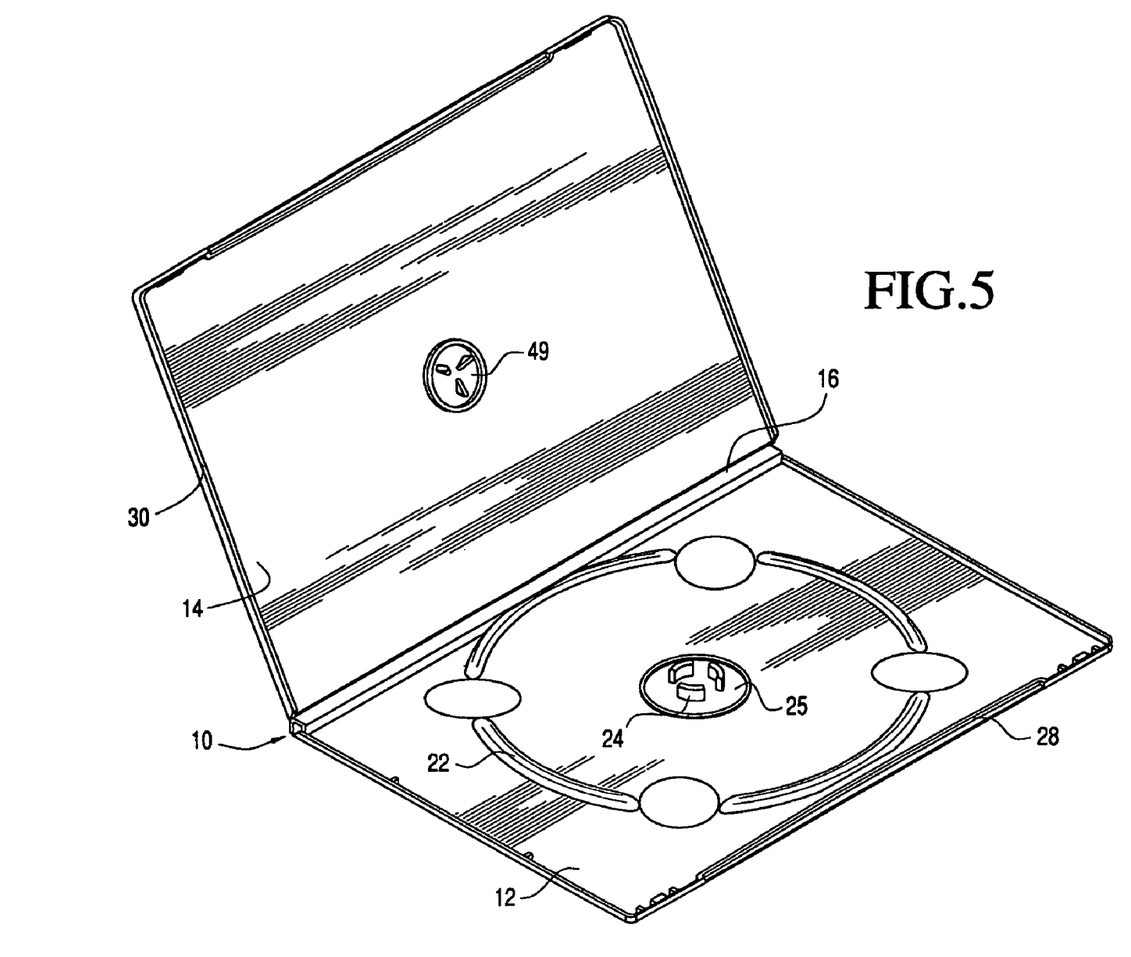
FIG. 5 is a perspective view of one embodiment of a single disc package of the present invention.
Figure 6:
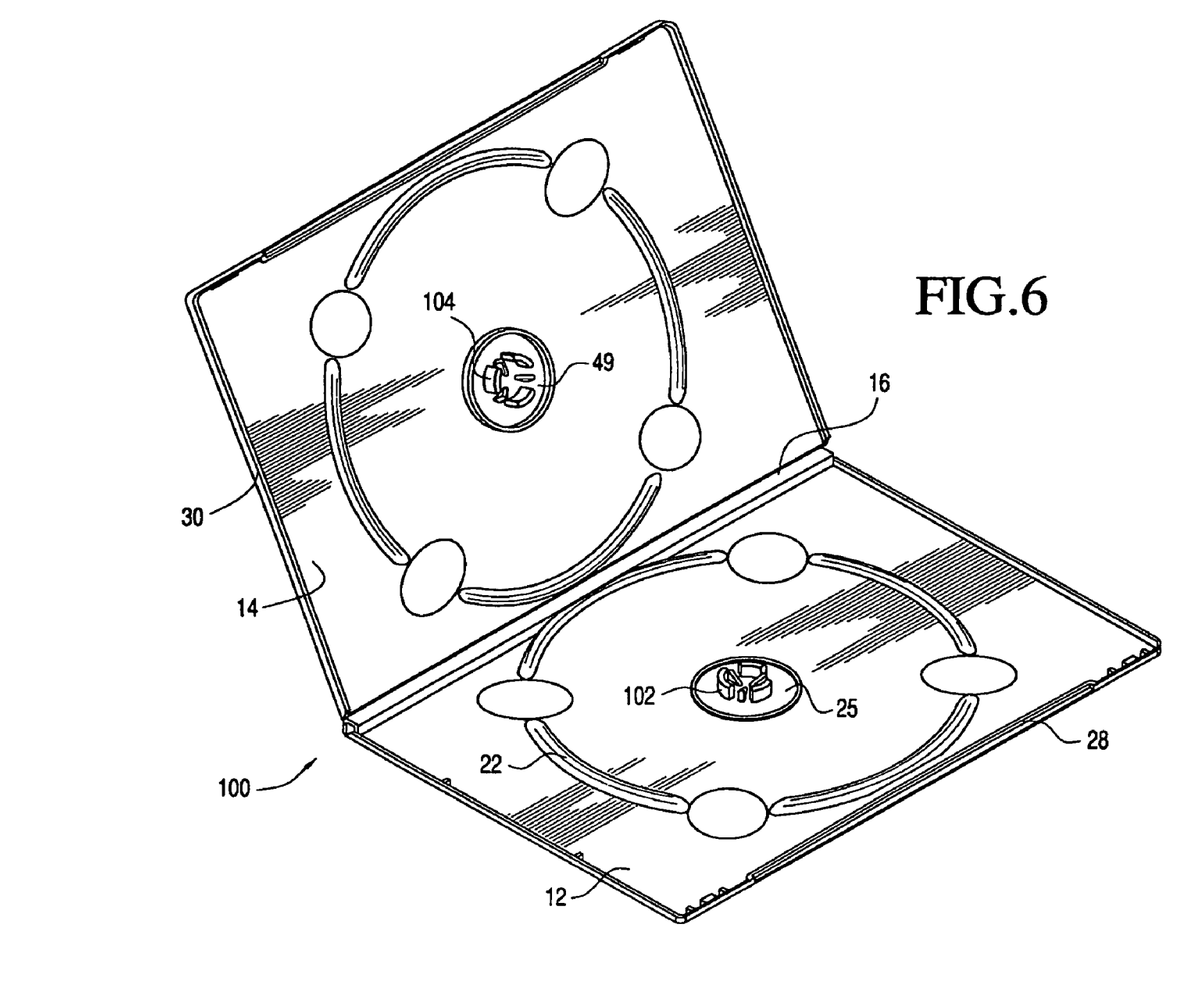
FIG. 6 is a perspective view of one embodiment of a double disc package of the present invention.

The present invention, in the embodiment disclosed in FIGS. 1-3 5 and 7a,b,c comprises a very thin, clamshell type package 10 for a single media disc, such as a CD or DVD disc (not shown), comprising a base 12 and a cover 14 separated by a spine panel 16 having living hinges 18, 20 between the spine panel 16 and each of the base 12 and cover 14 to allow the base 12 and cover 14 to pivot between open and closed positions. An upstanding circular rim 22, which may be continuous or interrupted, rises from the base having a diameter dimension slightly larger than the diameter of the disc to protect the peripheral edge of the disc when it is mounted on the rosette 24, which rises from a raised hub 25 positioned at the center of the upstanding circular rim 22. At one or more diametrically opposed "corners" of the rim 22, there may be depressed finger wells 26 to provide finger access to the rim of the disc mounted on the rosette 24. Upstanding marginal rims 28, 30 rise from the base and cover, respectively, on all peripheral edges thereof other than the spine edges. Desirably, the cross-sectional profile of at least portions of the base rim 28, as can be seen in FIG. 3, present a C-shaped female receptacle 32 for receiving the cross sectional male profile 34, see FIG. 2, of the cover rim 30. The male and female receptacle/profile 32, 34 engage each other with a snap fit when the package 10 is closed. Alternatively, other well known means for engaging the base 12 and cover 14 when the package 10 is closed can be utilized.

Figure 7A:
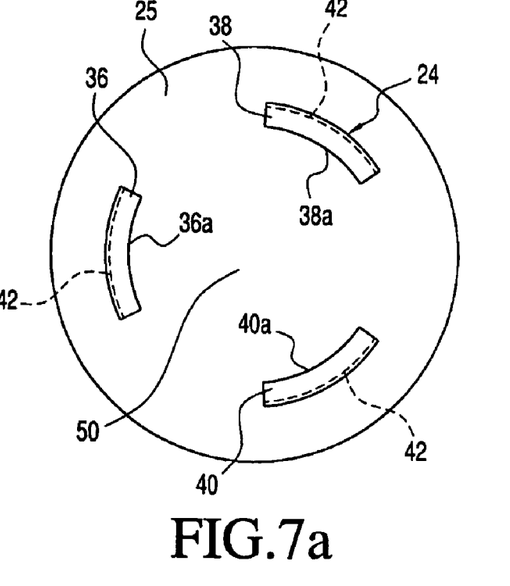
FIG. 7a is a plan view of the base hub and rosette of one embodiment of a single disc package of the present invention.
Figure 7B:
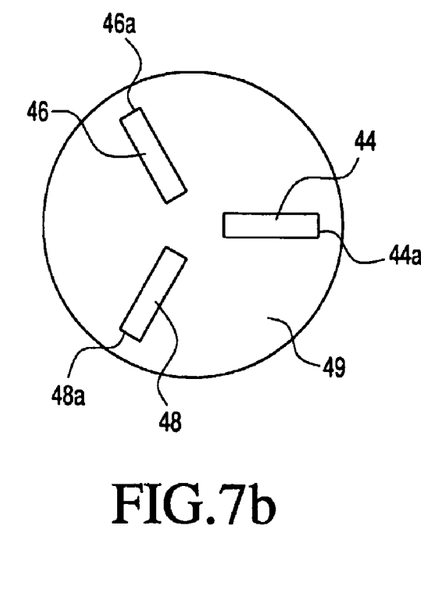
FIG. 7b is a plan view of the cover hub and rib features of one embodiment of a single disc package of the present invention.
Figure 7C:
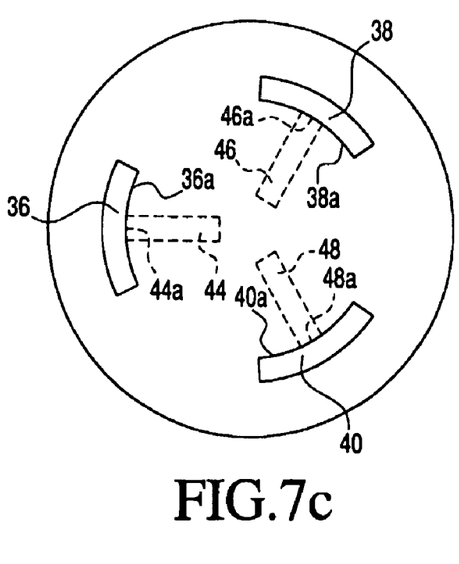
FIG. 7c is a plan view of the base hub and rosette and the cover hub and rib features interengaged after the single disc package is closed.

One aspect of the invention resides in the rosette 24 which rises from the base 12 and comprises three upright circularly spaced-apart arcuate members 36, 38, 40 that are received within the central aperture of the disc and have radially outward extending protrusions 42 along the upper, outer edge thereof that retain the disc on the rosette 24. The diameter of the rosette 24 is slightly smaller than the diameter of the disc central aperture to allow the disc to spin on rosette 24. Opposite the rosette 24, on the inside of the cover 14, are three mating rib features 44, 46, 48 which protrude from a raised hub 49 mounted on the cover 14 into the inside 50 of the rosette 24, when the base and cover are in the closed position, and engage the three upright arcuate members 36, 38, 40. As can be seen in FIG. 7c, the dimensioning is such that the radial outermost edge 44a, 46a, 48a of each of the ribs contacts the inside radial surface 36a, 38a, 40a of the corresponding arcuate upright member to reinforce and brace the upright members and prevent them from partially or completely fracturing when a package containing a disc is dropped on its edge. The ribs contacting the upright arcuate members reinforce and add strength to the rosette, which protects the rosette against breakage during shipping and when dropped and prevents the disc from being crushed in the event a large force is exerted upon the center of the cover or base. The ribs and arcuate segments are taller than the upstanding marginal rims 28,30 to allow the ribs and segments to interengage when the marginal rims 28, 30 engage to close the package.

In a second embodiment, for a two disc package 100, illustrated in FIGS. 2-4, 6 and 8a,b,c, the structure on each of the base and cover is, in part, the same as the structure of the base and cover in the single disk package. Therefore, like elements are denoted by like reference numerals. A major difference is that there is a rosette 102 on the base 12 (see FIG. 8a) which comprises three circularly spaced apart upright arcuate members 106, 108, 110 and three ribs 118, 120, 122 disposed within the generally circular area defined between the arcuate members 106, 108, 110. There is also a rosette 104 on the cover 14 (see FIG. 8b) which comprises three arcuate members 112, 114, 116 and three ribs 124, 126, 128 disposed within the generally circular area defined between the arcuate members 112, 114, 116. It is noteworthy that the three upright arcuate members and the three ribs are positioned in substantially the same orientation on each of the cover 12 and the base 14 and are so positioned that, as the package is closed by pivoting one of the cover 12 and base 14 about the living hinges 18, 20, the three upright arcuate members on the base and cover, respectively, come into registry with and fit within the spaces (valleys) 130, 132 between the arcuate members on the cover 12 and base 14, respectively (see FIG. 8c). At the same time, the ribs on the base 12 and cover 14 enter into the opposite rosette 104, 102, respectively, in such a manner that the ribs on the cover 12 and base 14 do not contact each other. This interfitting of the arcuate members and the ribs has the advantage that a thinner overall package 100 can be designed because the rosette height does not adversely impact the overall package height. Moreover, as with the single disc package, the interlocking feature adds additional strength to the rosettes for increased shipping toughness and resistance to impact.

Figure 8A:
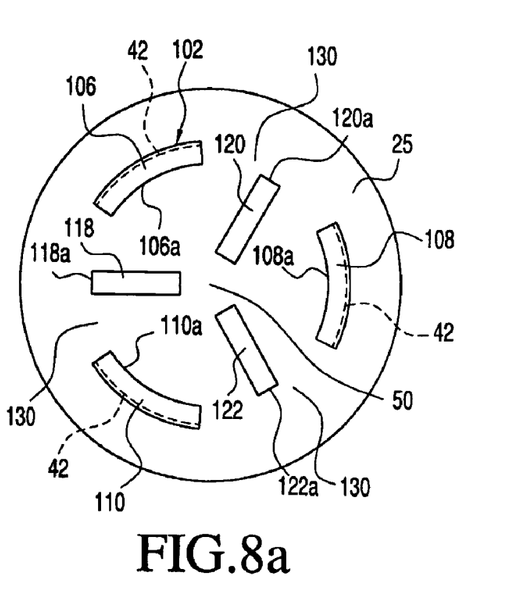
FIG. 8a is a plan view of the base hub and rosette of one embodiment of a double disc package of the present invention.
Figure 8B:
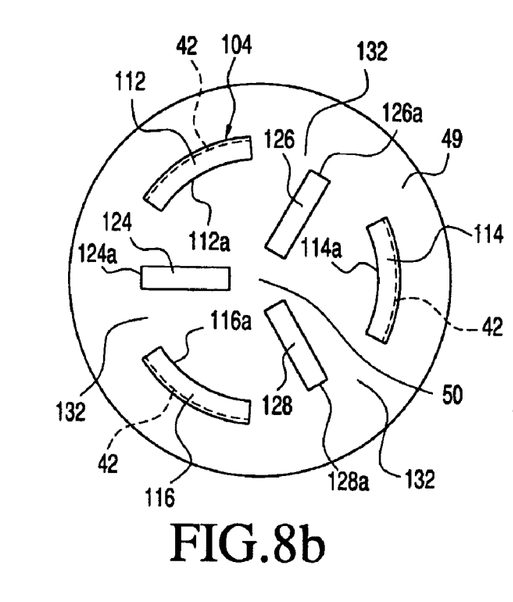
FIG. 8b is a plan view of the cover hub and rib features of one embodiment of a double disc package of the present invention.
Figure 8C:
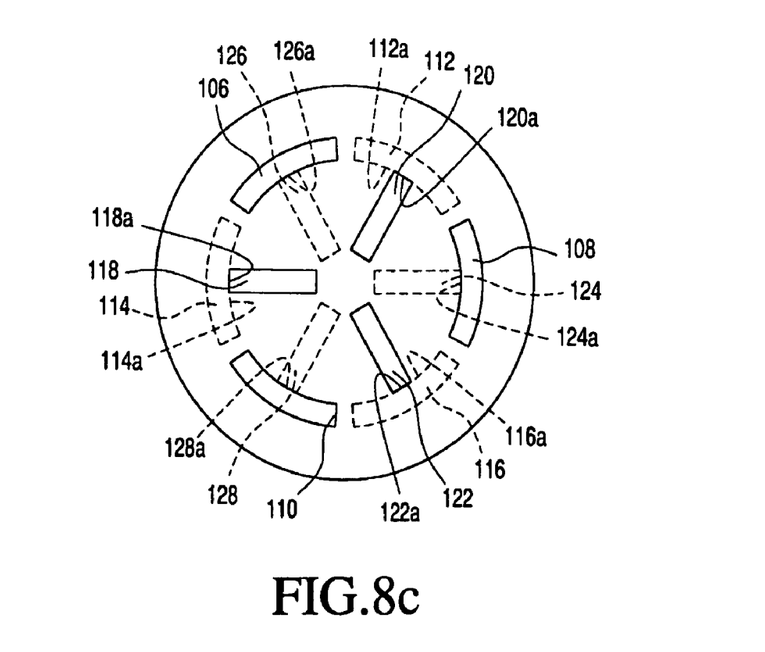
FIG. 8c is a plan view of the base hub and rosette and the cover hub and rib features interengaged after the double disc package is closed

With reference to FIGS. 8a,b,c, the dimensioning is such that, when package 100 is closed, the radial outermost edge 118a, 120a, 122a of each of the base ribs 118, 120, 122 contacts the inside radial surfaces 112a, 114a, 116a of the corresponding cover arcuate upright members 112, 114, 116 and reinforces and braces the cover upright members 112, 114, 116 to keep them from partially or completely fracturing when a package containing discs is dropped on its edge. Likewise, the radial outermost edge 124a, 126a, 128a of each of the cover ribs 124, 126, 128 contacts the inside radial surfaces 106a, 108a, 110a of the corresponding base arcuate upright members 106, 108, 110 and reinforces and braces the base upright members 106, 108, 110 to keep them from partially or completely fracturing when a package containing discs is dropped on its edge. The ribs contacting the arcuate upright members add strength to the rosette, which protects the rosette against breakage during shipping and when dropped and prevents the discs from being crushed in the event a large force is exerted upon the center of the cover or base. As with the single disc package, the ribs and arcuate segments are taller than the upstanding marginal rims 28,30 to allow the ribs and segments to interengage without the discs on the base and cover rosettes touching when the marginal rims 28, 30 engage to close the package.

In a preferred embodiment the center of each arcuate member is positioned at 120° intervals about the rosette 24 and the corresponding ribs form angles of 120° with each other. However, the present invention is not limited to each rosette comprising three arcuate members and three ribs. Rather, the invention contemplates that each rosette comprises at least two arcuate members and a corresponding number of ribs. Most desirably, the arcuate members are equally spaced apart about the rosette and the corresponding ribs are equally spaced apart.

While the present invention has been described in terms of specific embodiments thereof, it will be understood that no limitations are intended to the details of construction or design other than as defined in the appended claims.

The invention claimed is:

1. An enclosure for securing and storing at least one disc-shaped element having a central aperture therein, said enclosure comprising:
   a substantially planar base having a first area for receiving a centrally apertured disc-shaped element;
   a substantially planar cover;
   a spine panel pivotably connecting said base and cover for allowing the base and cover to pivot between enclosure open and closed positions;
   a two part rosette for securing said at least one disc-shaped element in said enclosure, said rosette including;
      a first part centered in said area on said base, said first part comprising at least two upstanding, circularly spaced apart segments having arcuate outer peripheral surfaces dimensioned for engaging the central aperture of a disc-shaped element at circularly spaced apart positions around said central aperture;
      a second part attached to said cover, said second part comprising at least two elongate, upstanding ribs extending radially from a position on said cover which is centered on said area of said base, the number of ribs on said cover corresponding to the number of segments on said base, the ribs being positioned and dimensioned such that, when the enclosure is closed, the ribs on the cover enter said first part radially inwardly of said segments on said first part with the a radial outermost edge of each of the ribs contacting the radially inside surface of a corresponding one of said arcuate segments for biasing the arcuate segments radially outwardly to better retain a disc-shaped element when it is mounted on said arcuate segments in said first area;
   wherein said cover includes a second area for receiving a centrally apertured disc, said ribs on said cover being centrally positioned within said second area, said second area being in registry with said first area when said enclosure is closed, said second part including at least two upstanding, circularly spaced apart segments having arcuate outer peripheral surfaces dimensioned for engaging the central aperture of a disc-shaped element at circularly spaced apart positions around said central aperture, said segments being positioned in said second area radially outwardly of said ribs on said cover, said first part including at least two elongate, upstanding ribs extending radially from a position on said base which is centered on said second area of said cover, the number of ribs on said base corresponding to the number of segments on said cover, the ribs on said base being positioned and dimensioned such that when the enclosure is closed, the segments on the base and cover do not contact each other and the ribs on the base enter said second part radially inwardly of said segments on said second part, without contacting the ribs on said cover, with said radial outermost edge of each of said ribs on said base contacting the radially inside surface of the corresponding segments on said cover for biasing the segments radially outwardly to better retain a disc-shaped element when said disc-shaped element is mounted on said segments in said second area, whereby said enclosure is capable of securing and storing at least two disc shaped elements having a central aperture therein.

2. An enclosure, as claimed in claim 1, wherein there are three segments and three ribs on each of said base and cover.

3. An enclosure, as claimed in claim 1, wherein the segments on said cover and said base are so positioned relative to each other that, when the enclosure is in the closed position, the segments on the cover are positioned between the arcuate segments on said base.

4. An enclosure, as claimed in claim 1, wherein said segments and said ribs on said base are mounted on a raised hub centered in said first area.

5. An enclosure, as claimed in claim 1, wherein said segments and said ribs on said cover are mounted on a raised hub centered in said second area.

6. An enclosure, as claimed in claim 1, including radially outward extending protrusions along the upper, outer peripheral edges of segments on said base and on said cover.

7. An enclosure, as claimed in claim 1, wherein said first and second areas are each defined by a continuous or interrupted circular rim rising from said base and cover, respectively, said rim having a diameter dimension slightly larger than the diameter of a disc-shaped element.

8. An enclosure, as claimed in claim 6, including at least one fingerwell defined in said upstanding circular rims and said base and cover, respectively, and communicating with said first and second areas, respectively.

* * * * *